Figure 5:
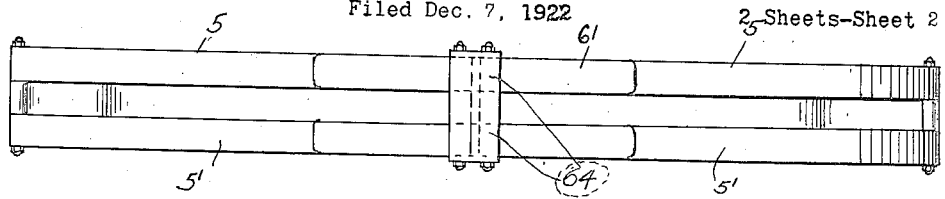

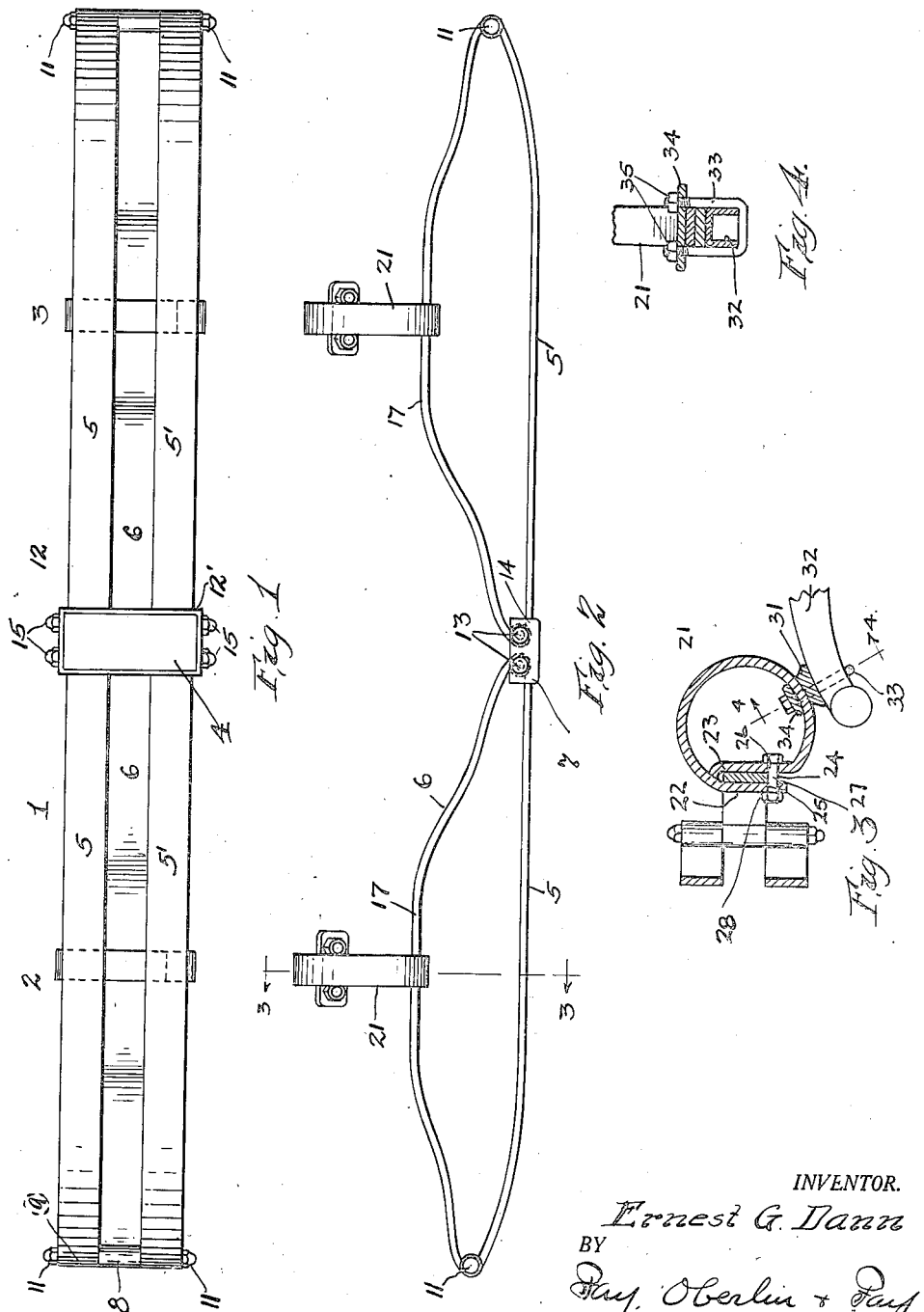

May 15, 1923.

E. G. DANN

SPRING BUMPER

Filed Dec. 7, 1922  2 Sheets-Sheet 2

1,455,082

INVENTOR.
Ernest G. Dann
BY
Fay, Oberlin & Fay
ATTORNEYS

Patented May 15, 1923.

1,455,082

UNITED STATES PATENT OFFICE.

ERNEST G. DANN, OF CHICAGO, ILLINOIS.

SPRING BUMPER.

Application filed December 7, 1922. Serial No. 605,494.

*To all whom it may concern:*

Be it known that I, ERNEST G. DANN, a citizen of the United States, and a resident of Chicago, county of Cook, and State of Illinois, have invented a new and useful Improvement in Spring Bumpers, of which the following is a specification, the principle of the invention being herein explained, and the best mode in which I have contemplated applying that principle, so as to distinguish it from other inventions.

This invention comprises a spring bumper and is of the type especially adapted for motor vehicles. More particularly it relates to a bumper wherein a plurality of impact bars of spring material are associated with supporting elements of spring material and adapted to be secured to the ends of the frame of an automobile or its associated members by means of bracket members of spring material. Thus the entire bumper and its supports are made of spring material.

Spring bumpers, as heretofore constructed, have usually included members of considerable length, not infrequently, the means of attachment to the automobile and the impact members being integral spring elements suitably shaped to perform the several functions. In other instances such members have been so shaped that by uniting several of them by means of spring clips a complete bumper would be provided. With such constructions, however, there has usually been the necessity of having special machinery to form a number of different parts to be later assembled, and the use of spring members of great length and of peculiar form has made bumpers of this character ill-adapted for shipment in quantity to points of distribution and at the same time has required such parts to be formed of metal of heavier guage because of the strains imposed upon the outwardly bowed supporting portions thereof.

One of the objects of my invention is to obviate the disadvantages above referred to and to provide a spring bumper having standardized parts few in number and interchangeable, and of relatively short length so that a complete bumper may be shipped in compact knockdown form and later assembled by using a number of identically shaped elements. It is also an object of my invention to provide supporting points for the bumper so distributed that material of lighter gauge may be used and wherein the degree of resistance to impact and permanent deformation will be superior to that of bumpers embodying a larger amount of material. It is a further object of my invention to provide a bumper having two unit sections joined centrally by means of a pivotal connection whereby shocks sustained by one of the bumper sections will be distributed through the several members of the other bumper unit through a rocking action about a pivot connecting the bumper sections. Other objects of my invention will appear in the course of the following description. To the accomplishment of the foregoing and related ends, said invention, then, consists of the means hereinafter fully described and particularly pointed out in the claims.

The accompanying drawing and the following description set forth in detail certain mechanism embodying the invention, such disclosed means constituting, however, but one of various structural forms in which the principle of the invention may be used.

In said accompanying drawing:—

Figure 6:
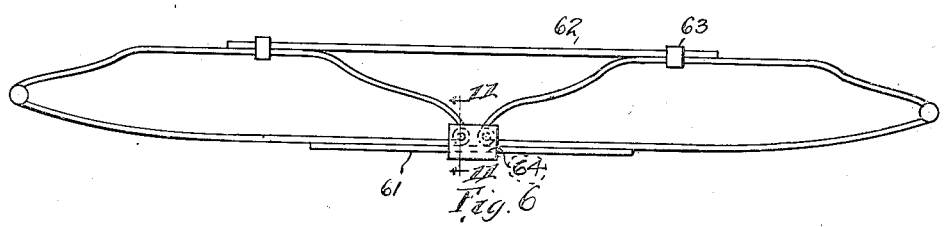
Figure 7:
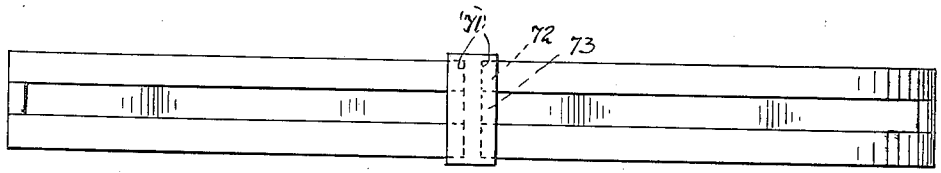
Figure 8:
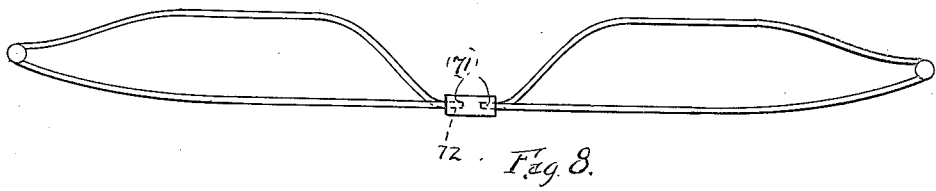
Figure 9:
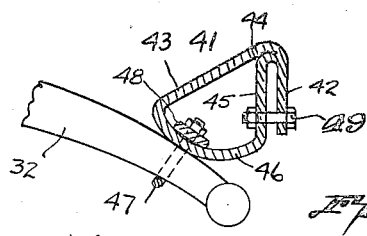
Figure 10:
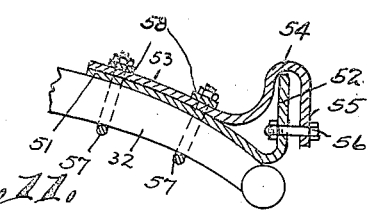
Figure 11:
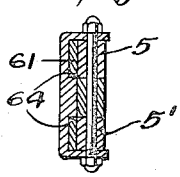

Fig. 1 is a front elevation of the improved bumper; Fig. 2 is a top plan view thereof; Fig. 3 is a longitudinal sectional detail view, taken along the line 3—3 shown in Fig. 2 looking in the direction of the arrows; Fig. 4 is a transverse sectional detail view taken along the line 4—4 shown in Fig. 3, looking in the direction of the arrows; Fig. 5 is a front elevation of a modified form of my device wherein reinforced impact plates are employed; Fig. 6 is a top plan view thereof; Fig. 7 is a front elevation of a modified form of my device wherein the central plate is recessed to receive the inner ends of the respective supporting and impact bars; Fig. 8 is a top plan view thereof; Fig. 9 is a transverse detail sectional view showing a modified form of the structure illustrated in Figs. 3 and 4; Fig. 10 is a detail side elevation of a modified form of supporting bracket, and Fig. 11 is a sectional view of the central plate and associated parts of the type of bumper illustrated in Figs. 5 and 6, taken along the line 11—11 shown in Fig. 6.

As is clearly shown in Fig 1 of the drawing, the bumper 1, is formed in two half sections 2, 3, joined centrally by means of a supporting plate 4. Each section is in effect a complete bumper unit, having parallel impact bars 5, 5' of spring material at its upper and lower edges and a supporting bar 6 of spring material positioned centrally between said impact bars and bowed rearwardly so as to be spaced from said impact bars a distance of approximately one-fourth the length of the impact bars. It is of course to be understood that any desired conformation of the several bars may be produced, but the preferred form is that illustrated. The ends of the several bars are rolled upon themselves to provide eyes 8 through which a long pin or bolt of suitable length is inserted. The pins 9 used at the outer ends are each provided with screw threaded ends upon which nuts or caps 11 are engaged to hold the parts in operative relation.

The central plate 7 is formed of heavy metal and is of substantial size, having rearwardly extending top and bottom flanges 12, 12' within which are supported parallel pins 13 over which are engaged the eyes at the inner ends of the respective bumper members in a manner similar to the connections of the extremities shown at the left hand end of Figure 1. The inner face 14 of the central plate in the preferred form of the construction is adapted to overlap and bear against the outer faces of the impact members of the bumper sections and serves to hold them in transverse alinement with each other. Suitable fastening elements or caps 15 are secured to said pins upon the upper and lower ends thereof whereby the same may be applied to or disengaged from the bumper elements as may be desired. The supporting spring bars 6 are preferably provided with straight central sections 17 which serve as points of attachment to the frame of the automobile. This connection of the bumper to the automobile is accomplished by means of a spring bracket 21 of either of the forms shown in Figs. 3, 9 and 10. This bracket as shown in Fig. 3, comprises a spring metal section having a flat forward face 22 and curved to substantially circular outline at the rear thereof, the inner end 23 being upwardly turned to meet the front flat face of the outer end of the spring closely adjacent the point where it merges with the curved portion whereby a recess 24 is provided between said flat front section and the other end of said spring of a size suitable to receive therein the straight portion of the supporting member of the bumper unit. A pair of alined bolt holes 25, 26 are provided in the supporting bracket adjacent the lower end of the front face so as to permit a bolt 27 to be inserted beneath the supporting section of the bumper unit when positioned within said recess. The bolt may be provided with a nut 28 at one end, as shown in the drawing, or the inner of said alined bolt holes may be screw threaded to receive the screw threaded end of said bolt. A supporting block 31 having a curved upper face conforming to the curvature of the spring bracket is provided of a width suitable to rest upon the top face of the frame member 32, or equivalent part, of an automobile. A U-bolt 33 of a suitable size to surround the frame member of the automobile and extend upwardly above the supporting block is designed to serve as a means for fastening the bracket to the automobile. The upper ends of the U-bolt are preferably inserted through a clamping plate 34 which may be straight or have a slightly rounded inner face, and which is designed to rest upon the inner surface of the spring bracket and be rigidly pressed against the supporting block upon the tightening of the nuts 35 upon the ends of the U-bolt. One spring bracket is provided for each unit or half section of the bumper and by shifting the circular portion of said brackets backwardly or forwardly any desired degree of tilt can be given to the bumper.

In Figs. 9 and 10 are shown modified forms of supporting brackets, the form of bracket 41 shown in Fig. 3 closely resembling the form shown in Fig. 3. It comprises a spring-metal section having a flat forward portion 42, but, instead of being gradually curved to substantially circular outline adjacent said flat section, it is abruptly bent downwardly so as to present a second flat section 43 inclined with respect to said forward flat portion. Thus, there is provided between the adjacent flat sections a restricted space 44 within which the inner end 45 of the bracket is received. This inner end of the bracket is turned upwardly as a flat section positioned in spaced parallel relation to the flat section formed at the other end of the spring-metal strip. The base portion 46 of the bracket may also be flattened but is preferably of gently curved outline. The bracket may be secured to the top face of the end of the frame member 32 or equivalent part of an automobile by means of a U-bolt 47 of suitable size to surround the frame member and a clamping plate 48 which is designed to bear directly upon the inner face of the curved bottom section of the plate or block. If desired, a supporting plate or block similar to that shown in Fig. 3 may be used, but where the frame end is of substantial size and downwardly tapered it is found that adequate supporting contact may be obtained without the use of such block. The straight portion of the supporting member of the bumper unit is adapted to be received in the space between the flat portions 42 and 45 of the bracket. The bracket is clamped into position by means of a bolt 49 similar to that described in connection with the type of bracket illustrated in Fig. 3.

The type of bracket shown in Fig. 10 is likewise formed of spring-metal strip material. In place of a single strip being used to form the bracket, as in the types illustrated in Figs. 3 and 9 two superposed strips are used to support the bumper. As is clearly shown in Fig. 10 the bumper comprises a lower strip 51 having its body section curved to conform to the top surface of the end of the frame member to which it is to be applied and having its outer end 52 bent upwardly at approximately a right angle to the body section thereof. The upper strip 53 is designed to overlie the lower strip 51 and to conform to the curvature of the body section thereof but at its outer end is at first bent upwardly and thereafter bent downwardly so as to provide a recess 54 within which the upwardly bent end of the lower strip 51 is received. The outer end 55 of the top strip is bent to the requisite degree to insure its position in spaced parallel relation to the upwardly turned end 52 of the lower strip when the parts are positioned together upon the end of a frame member. The supporting member of the bumper is designed to be received between the parallel ends of the respective strips and to be held in position by means of a bolt 56 passing through registering apertures in the respective strip ends.

The upper and lower strips are preferably secured to the frame ends by means of U-bolts 57 and clamping plates 58 of the type heretofore described.

The type of bumper illustrated in Figs. 5 and 6 is designed to be used on very heavy cars wherein a high resistance to impact is desirable. In this form of bumper, a bumper of the type disclosed in Fig. 1 is provided with a pair of reinforcing impact bars 61 positioned centrally over the forward faces of the standard impact bars 5 and 5′ heretofore described. These bars are held in position by means of the bolts provided rearwardly of the central plate which serve to draw the top and bottom sections of said central plate together and thus exert a clamping action upon the edges of said reinforcing bars which are disposed in suitable recesses 64 formed in the inner faces of said central plate, as is clearly shown in Fig. 11.

The supporting members of the bumper are likewise connected by means of a reinforcing bar 62 securely connected with the flat portions of said supporting members by means of clamps 63 of conventional design.

In Figs. 7 and 8 a modified form of construction is shown in which the central fastening bolts illustrated in Figs. 1 and 2 are dispensed with. In this form of the construction the central plate is provided with lateral recesses 71 within which the flat inner ends 72, 73 of the impact bars and supporting bars, respectively, are received. Each of the recesses 71 comprises a lateral slot formed in the central plate of the proper size to receive the ends of the several bumper bars at a driving fit. The central supporting bars may be driven into position after the impact bars have been inserted thus forcing the impact bars into very close-fitting relation with the central plate.

It will be obvious from the above description that in the several constructions described each bumper comprises in fact two bumpers of one-half the usual size, joined centrally by means of a supporting plate. In view of the manner in which the half sections of the bumper are supported it is evident that material of lighter gauge may be used to secure a degree of stiffness and resistance to shock equal to what would be found in bumpers of very much larger size and heavier gauge, and in which central impacts would necessarily have to be sustained solely by distant end supporting members. Furthermore, it will be noted that each of the impact bars is interchangeable with the other impact bars and that the same is true with respect to the several supporting bars. Thus, in the form of construction first described, but two standard types of spring elements need be provided to assemble a bumper of any desired number of impact and supporting members. Where very unusual stresses are to be met with the reinforcing impact and supporting plates shown in Figs. 5 and 6 may be used.

The central plate of the bumper besides improving the appearance of the same serves the important function of pivotally transferring the stresses imposed upon one section of the bumper to the spring members of the other section. Where the reinforcing impact plates are used they assist the central plate in distributing the shock to the resilient members of the bumper half sections.

It will be noted that the supporting elements for the bumpers are made of spring material of identical character and gauge with the spring elements of the bumper proper, although different lengths and shapes are utilized. A resilient buffer element is thus provided capable of cushioning an impact of great intensity and saving the vehicle to which the bumper is applied from breaking and tearing stresses which would otherwise produce serious damage. The construction is also one which lends itself to manufacture on a basis of economical and rapid production.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In an article of the class described, the combination of two individual bumper sections, each including a resilient outer impact member and a separate unitary inner supporting member and the members of each section being connected together at their adjacent extremities, and means connecting the adjacent extremities of said two sections together.

2. In an article of the class described, the combination of two individual bumper sections arranged end to end, and each section including a resilient outer impact member and a separate unitary inner supporting member, and the members of each section being connected together at their adjacent extremities to permit relative movement toward and away from each other, and means connecting the adjacent ends of said sections together.

3. In an article of the class described, the combination of two individual bumper sections arranged end to end, and each section including an impact member and a supporting member mounted with their adjacent ends in pivotal engagement, and means connecting the adjacent ends of two sections together.

4. In an article of the class described, the combination of two individual bumper sections arranged end to end, and each section including a forward impact member and a separate unitary rear supporting member having its ends connected to the ends of said impact member and its body portion bowed rearwardly away from the same, and means connecting the adjacent connected ends of two sections together.

5. In an article of the class described, the combination of two individual bumper sections arranged end to end, and each section including a forward resilient impact member and a separate unitary rear resilient supporting member having its ends connected to the ends of said impact member and its body portion bowed rearwardly away from the same, and an intermediate element between said two bumper sections, said element being pivotally connected to the connected ends of the members of each of said sections.

6. In an article of the class described, the combination of two individually complete bumper sections, said sections being arranged end to end to span the width of a motor vehicle, each section consisting of a forward resilient impact member and a separate unitary rear resilient supporting member having its ends connected to the ends of said impact member and its body portion bowed rearwardly away from the same, and means including an element pivotally connected to the adjacent ends of each of said sections.

7. In an article of the class described, the combination of two individually complete bumper sections, said sections being arranged end to end to span the width of a motor vehicle, and each section consisting of a forward resilient impact member of spring steel and a separate unitary rear resilient supporting member also of spring steel having its ends connected to the ends of said impact member and its body portion bowed rearwardly away from the same, and a plate pivotally connected about vertical axes to each of said bumper sections at their adjacent ends.

8. In an article of the class described, the combination of two individually complete bumper sections, said sections being arranged end to end to span the width of a motor vehicle, each section consisting of two bars of spring steel, said bars being spaced from each other throughout their body portions but pivotally connected together at their adjacent ends, supporting means fixedly and non-rotatably engaging the rearmost bar of each of said sections for attachment to the frame of the motor vehicle, and means connecting said two sections, said means operating to partially transmit an impact against one of said sections to the other thereof.

9. In an article of the class described, the combination of a plurality of impact bars of spring material connected longitudinally in pairs said pairs being vertically spaced from one another, a plurality of supporting bars of spring material each connected at its ends with the ends of one of the impact bars, and resilient means for connecting said supporting bars with the frame of an automobile.

10. In an article of the class described, the combination of a plurality of impact bars of spring material connected longitudinally in pairs said pairs being vertically spaced from one another, a plurality of supporting bars of spring material each connected at its ends with the ends of one of the impact bars, and resilient means of spring material of substantially circular outline adapted to be engaged over the supporting bars of the bumper and means for holding said circular supports in various positions upon the frame of a motor vehicle.

11. In an article of the class described, the combination of the parallel side members of a motor vehicle frame, two individually complete bumper sections, each consisting of two forward vertically spaced but parallel impact members of spring steel and a rear supporting member also of spring steel, said rear member having its ends connected to the adjacent ends of both of said impact members, means mounted on each of said frame members, each of said means fixedly engaging one of said supporting members and thereby supporting one of said bumper sections and said two sections being arranged with their forward impact members in alignment, and means connecting the adjacent ends of said two sections together.

12. In an article of the class described, the combination of the parallel side members of a motor vehicle frame, two individually complete bumper sections, each consisting of two forward vertically spaced but parallel impact members of spring steel and a rear supporting member also of spring steel, said rear member having its ends connected to the adjacent ends of both said impact members, means mounted on each of said frame members, each of said means fixedly engaging one of said supporting members and thereby supporting one of said bumper sections and said two sections being arranged with their forward impact members in alignment, and a plate pivotally connected to the adjacent ends of both of said sections.

13. In an article of the class described, the combination of two individual bumper sections, each section including a resilient outer impact member and an inner supporting member, said members being connected at their adjacent extremities, a link between the inner ends of the two sections, and pivotal connections between said link and the inner ends of each member of each section.

14. In an article of the class described, the combination of two bumper sections, each comprising a resilient outer impact member and an inner supporting member, the two impact members extending across the front of the vehicle and being in substantial alignment to present a continuous impact surface across the entire width of the vehicle, and the outer and inner members of each section being pivotally connected at their outer ends, and the inner or central ends of said impact and supporting members being also pivotally interconnected to allow each of said bumper sections to support and reinforce the other thereof.

Signed by me, this 4th day of December, 1922.

ERNEST G. DANN.